United States Patent [19]
Whittemore et al.

[11] Patent Number: 5,948,267
[45] Date of Patent: Sep. 7, 1999

[54] COMPOSITION AND METHOD FOR INHIBITING CHLORIDE-INDUCED CORROSION AND LIMESCALE FORMATION ON FERROUS METALS AND ALLOYS

[75] Inventors: Michael Whittemore, Summerfield; Gerald LaCosse; Jennifer Riley, both of Greensboro, all of N.C.

[73] Assignee: Kay Chemical Company, Greenboro, N.C.

[21] Appl. No.: 08/850,144

[22] Filed: May 2, 1997

Related U.S. Application Data

[60] Continuation of application No. 08/601,322, Feb. 16, 1996, abandoned, which is a division of application No. 08/320,149, Oct. 7, 1994, abandoned.

[51] Int. Cl.$^6$ ....................................................... C02F 5/10
[52] U.S. Cl. .......................... 210/698; 252/181; 252/396; 422/17
[58] Field of Search ............................ 210/696, 698–701; 252/180, 181, 388, 396; 422/12, 17

[56] References Cited

U.S. PATENT DOCUMENTS

| | | | |
|---|---|---|---|
| 2,264,103 | 11/1941 | Tucker et al. | 210/698 |
| 3,308,062 | 3/1967 | Gunther | 210/698 |
| 3,433,739 | 3/1969 | Newman | 210/698 |
| 3,635,826 | 1/1972 | Hamilton | 252/79.4 |
| 3,696,044 | 10/1972 | Rutledge | 252/180 |
| 3,705,109 | 12/1972 | Hausler et al. | 252/392 |
| 4,032,460 | 6/1977 | Zilch et al. | 166/310 |
| 4,120,655 | 10/1978 | Crambes et al. | 422/15 |
| 4,138,353 | 2/1979 | Lipinski | 252/181 |
| 4,470,951 | 9/1984 | Bradbury et al. | 376/310 |
| 4,512,552 | 4/1985 | Katayama et al. | 252/181 |
| 4,540,443 | 9/1985 | Bazber | 252/80 |
| 4,661,261 | 4/1987 | Chambers | 210/698 |
| 4,705,573 | 11/1987 | Wood et al. | 134/3 |
| 4,721,532 | 1/1988 | Kuhn et al. | 252/82 |
| 4,731,124 | 3/1988 | Bradbury et al. | 134/3 |
| 4,802,990 | 2/1989 | Inskeep, Jr. | 252/180 |
| 4,869,841 | 9/1989 | Matteodo et al. | 252/79 |
| 4,885,136 | 12/1989 | Katayama et al. | 422/15 |
| 4,927,550 | 5/1990 | Culcher et al. | 252/32.5 |
| 5,015,298 | 5/1991 | Arrington | 134/2 |
| 5,024,783 | 6/1991 | Busch et al. | 252/180 |
| 5,147,555 | 9/1992 | Brown et al. | 252/180 |
| 5,169,563 | 12/1992 | Katayama | 252/181 |
| 5,322,635 | 6/1994 | Hieatt et al. | 210/698 |

FOREIGN PATENT DOCUMENTS

| | | |
|---|---|---|
| 0060224 | 9/1982 | European Pat. Off. . |
| 283299 | 10/1992 | Japan . |

OTHER PUBLICATIONS

Working Data—Carpenter Stainless Steels 104–114 (Carpenter Technology Corp. 1973).
Perry's Chemical Engineers' Handbook 23:3–9 (6th Ed. 1984).
The Nalco Water Handbook 20:1–12 (2d Ed. 1988).
Metals Handbook 13:108–14, 142–63, 494–97, 547–65 (9th Ed. ASM Int'l. 1987).

*Primary Examiner*—Peter A. Hruskoci
*Attorney, Agent, or Firm*—Finnegan, Henderson, Farabow, Garrett & Dunner, L.L.P.

[57] ABSTRACT

The present invention relates to a composition and method for inhibiting chloride-induced corrosion and limescale formation on ferrous metal surfaces and alloys in process systems in which aqueous solutions are concentrated, the composition containing a corrosion inhibiting amount of at least one polycarboxylic acid and/or its alkali metal or alkaline earth metal salts and a sufficient amount of a base to bring the water to a pH effective to inhibit both chloride-induced corrosion and limescale formation.

8 Claims, No Drawings

COMPOSITION AND METHOD FOR INHIBITING CHLORIDE-INDUCED CORROSION AND LIMESCALE FORMATION ON FERROUS METALS AND ALLOYS

This is a continuation of application Ser. No. 08/601,322, filed Feb. 16, 1996, now abandoned, which is a divisional application of Ser. No. 08/320,149, filed Oct. 7, 1994, abandoned.

BACKGROUND OF THE INVENTION

The present invention relates to a composition and method for inhibiting lime scale formation and chloride-induced corrosion of ferrous metals and alloys in processes in which aqueous solutions are concentrated, thus increasing the concentration of ionic species, even in water of high hardness and high chloride content. As used in the present specification, "aqueous solution" refers to ion-containing solutions which are primarily composed of water, such as tapwater or saltwater and the like.

Significant problems exist for systems in which aqueous solutions become concentrated, such as flash heating systems in which feedwater is vaporized by contact with a heat transfer surface. Examples of such flash heating systems include the food storage cabinets used by the fast food industry, in which water is flash evaporated by contact with a metal heat transfer surface to provide a hot, humid environment for temporary food storage. Problems associated with these systems include chloride-induced corrosion and stress-corrosion cracking in systems constructed of ferrous metals and alloys, such as austenitic stainless steels and carbon steels.

Austenitic stainless steels and the like are generally resistant to the corrosive action of most environments due to the formation of a passive oxide film on the surface of the metal. Halides in general and chlorides in particular, however, readily promote localized pitting corrosion of austenitic steels by penetrating this passive oxide film at localized sites, which in turn further breaks down the surrounding passive areas. This results in more corrosive attack by the chloride containing water.

Pitting, and the concomitant corrosion fatigue, often referred to as stress corrosion cracking, can occur in systems using water having only nominal chloride concentrations, such as 10 parts per million or less. This is a particular problem in flash heating systems, as the instantaneous vaporization of the feedwater on the heat transfer surface tends to concentrate the chloride ions on that surface and thus creates localized areas of high chloride concentration.

An additional factor contributing to the problems of pitting and stress corrosion cracking is formation of limescale deposits on the heat transfer surface. These deposits typically consist of 90–95% calcium carbonate ($CaCO_3$) and 5–10% of magnesium carbonate ($MgCO_3$). The solubility of these calcium and magnesium carbonate salts in the feedwater decreases as the temperature of the feedwater increases. Consequently, flash evaporation of even low hardness water can cause significant limescale deposition on heat transfer surfaces.

Limescale deposits contribute to localized pitting and corrosion by preventing oxygen from contacting the heat transfer surface. This prevents the formation and maintenance of the protective passive oxide film that usually forms on austenitic surfaces. Limescale formation also acts as a barrier to heat transfer, which in turn means that the use of higher temperatures to achieve proper flash vaporization is required. These higher temperatures increase the magnitude of the stress cycle created by the constant heating and cooling of the heat transfer surface, thus further promoting stress corrosion cracking.

In order to overcome these problems, one approach has been pretreatment or conditioning of the feedwater in an effort to reduce the concentrations of deleterious ions. Several methods have been developed to accomplish this reduction, including the use of reverse-osmosis and ion-exchange filtration units. These methods, however, while providing significant reductions in the ion content of the feedwater, cannot completely remove all of the deleterious ions from the feedwater. Consequently, these methods slow development of corrosion and scale but cannot eliminate their formation.

An alternative approach to reducing corrosion involves the addition of corrosion inhibitors to the feedwater. These corrosion inhibitors are generally classified according to which half of the corrosion reaction they inhibit.

More specifically, anodic inhibitors prevent the migration of metal ions from the metal surface into the water, thus inhibiting the anodic half of the reaction. Anodic inhibitors typically act by initiating or promoting the formation of an oxide film on the metal heat transfer surface. These inhibitors, however, are usually quite sensitive to the pH and chloride ion concentration of the feedwater, and generally have a critical minimum concentration, below which the inhibitor will actually facilitate localized corrosion. Because of this problem, anodic inhibitors are generally not used to prevent this type of corrosion. Examples of typical anodic inhibitors include chromates, nitrates and nitrites, molybdates and phosphates. These inhibitors may be used individually or in combination with one another or even together with cathodic inhibitors.

Unlike anodic inhibitors, cathodic inhibitors isolate the cathodic area of the metal surface from the aqueous environment by precipitating and forming an insoluble film, thus inhibiting the cathodic half of the reaction by preventing further reaction at these sites. Cathodic inhibitors are generally less effective corrosion inhibitors than anodic inhibitors. Examples of typical cathodic inhibitors include zinc ions, polyphosphates and phosphonates. Cathodic inhibitors may be used individually or in combination with other cathodic and/or anodic inhibitors.

Limescale formation on heat transfer surfaces may also be controlled by chemical treatment of the feedwater. In the past, such treatment usually involved addition of acidic compounds, such as sulfuric acid, to the feedwater, causing a shift in the solubility equilibrium away from formation of calcium carbonate.

The more common treatments in use today tend to focus on inhibiting either the nucleation or crystal growth stages of the scale formation process. For example, poly(inorganic phosphates) and phosphonates adsorb onto nuclei and growing limescale crystals, thus inhibiting both nucleation and crystal growth. Under certain conditions, however, the polyphosphates can hydrolyze to form phosphate ions, which both destroys the inhibiting action of the additive and actually encourages the formation of insoluble calcium phosphate scale. Similarly, phosphonates are degraded to phosphate ions by aqueous solutions containing even low concentrations of chloride.

Organic polymers are also presently used to control scale formation. These polymers, such as polyacrylates and polymethacrylates, act as dispersants and prevent scale formation by keeping small particles of scale in suspension. Organic polymers, however, are generally not suitable for use in hot aqueous environments, such as flash heating systems, where they would degrade and decompose.

SUMMARY OF THE INVENTION

Accordingly, the present invention is directed to a composition that can inhibit both chloride-induced corrosion and limescale formation on ferrous metals and alloys, even in water of high hardness and chloride content, without the problems associated with conventional compositions and methods.

Additional features and advantages of the invention will be set forth in the description which follows, and in part will be apparent from the description or may be learned from practice of the invention. The advantages of the invention will be realized and attained by the composition particularly pointed out in the written description and claims.

To achieve these and other advantages and in accordance with the purpose of the invention, as embodied and broadly described, the invention provides a composition for inhibiting chloride-induced corrosion and limescale formation on ferrous metal surfaces and alloys, which contains a corrosion inhibiting amount of at least one polycarboxylic acid and/or its alkali metal or alkaline earth metal salts and a sufficient amount of a base to bring the aqueous solution to a pH effective to inhibit both chloride-induced corrosion and limescale formation.

There is also provided a method for inhibiting chloride-induced corrosion and limescale formation on ferrous metal surfaces and alloys by adding to an aqueous solution a corrosion inhibiting amount of at least one polycarboxylic acid and/or its alkali metal or alkaline earth metal salts and a sufficient amount of a base to bring the aqueous solution to a pH effective to inhibit both chloride-induced corrosion and limescale formation.

It is to be understood that both the foregoing general description and the following detailed description are exemplary and explanatory and are intended to provide further explanation of the invention as claimed.

DETAILED DESCRIPTION OF THE INVENTION

A first embodiment of the present invention is directed to a composition which can inhibit limescale formation and chloride-induced corrosion of ferrous metals alloys in processes in which aqueous solutions are concentrated, e.g. by rapid heating, comprising at least one polycarboxylic acid and a sufficient amount of a base to bring the pH of the aqueous solution to a level at which chloride-induced corrosion and limescale formation are both inhibited.

The polycarboxylic acid, i.e., an acid having two or more carboxylic acid moieties, may be a free acid or in the form of an alkali metal or alkaline earth metal salt. Suitable polycarboxylic acids are available from commercial sources or can be prepared from available materials using the methods known to those skilled in the art.

In a preferred embodiment, the present composition contains a mixture of a polycarboxylic acid and the alkali metal or alkaline earth metal salt of that acid. Mixtures of more than one polycarboxylic acid and/or more than one alkali metal or alkaline earth metal salt may also be used in the inventive composition.

Preferably, the polycarboxylic acid is an organic dicarboxylic acid or organic tricarboxylic acid. More preferably, the polycarboxylic acid is a $C_2$–$C_8$ di- or tricarboxylic acid, which may be saturated or unsaturated. The di- or tricarboxylic acid may be unsubstituted or substituted, for example with one or more hydroxy groups. The polycarboxylic acid may also be an aromatic di- or tri-carboxylic acid.

Illustrative examples of such polycarboxylic acids which are suitable for use in the present invention include citric acid, oxalic acid, malonic acid, succinic acid, glutaric acid, adipic acid, pimelic acid, octanedioic acid, tartaric acid, malic acid, glutamic acid, maleic acid and fumaric acid. Preferably, the polycarboxylic acid is a nontoxic food-grade acid. Most preferably, the polycarboxylic acid is citric acid.

The polycarboxylic acids used in the present invention may be employed as free acids or as their alkali metal or alkaline earth metal salts. Cations which form suitable alkali metal salts for use in the present composition include sodium and potassium. Examples of suitable alkaline earth metals include calcium and magnesium.

The polycarboxylic acid is used in an amount that is effective to inhibit chloride-induced corrosion. One skilled in the art can readily determine a suitable amount of acid by either plate testing or enclosure testing. Preferably, when citric acid and/or an alkali metal or alkaline earth metal salt of citric acid is used, the amount of acid employed is sufficient to provide at least 2000 parts per million of citrate.

The composition of the present invention further contains a sufficient amount of a base to bring the pH of the aqueous solution to a pH effective to inhibit limescale formation and corrosive attacks. Preferably, the amount of base is sufficient to bring the pH of the aqueous solution to from about 3 to about 7. More preferably, the amount of base is sufficient to bring the pH of the aqueous solution to from about 4 to about 5. In certain embodiments of the present invention, i.e., when the polycarboxylic acid alone provides an aqueous solution having a pH effective to inhibit limescale formation, addition of a base will not be necessary.

Bases suitable for use in the present invention include any source of alkalinity sufficient to bring the pH of the aqueous solution to the requisite level for inhibiting limescale formation and corrosive attacks. Both inorganic and organic bases, or mixtures of such bases, may be used in the inventive composition. Illustrative examples of bases suitable for use in the present invention include trisodium citrate, sodium hydroxide, potassium hydroxide, sodium carbonate and potassium carbonate.

The inventive composition is particularly useful for inhibiting chloride-induced corrosion and limescale formation on ferrous metal surfaces and alloys in process systems in which aqueous solutions are concentrated, such as flash heating systems. In a particularly preferred embodiment, a composition according to the present invention is added to the aqueous solution prior to concentration. The ingredients of the composition may be added separately to the aqueous solution, or admixed prior to addition.

The composition may be in any form suitable for its intended use, such as a water soluble dry powder or aqueous solution. A dry powder of the admixed ingredients of the inventive composition is particularly preferred. The composition may also contain any of the inert additives, diluents and excipients known to the art for use in compositions of this type. For example, the composition may contain a surfactant to facilitate wetting and dissolution of the active ingredients in the aqueous solution.

The following examples of the inventive composition are merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

SAMPLE COMPOSITIONS

| SAMPLE NO. 1 | |
| --- | --- |
| citric acid | 70 wt % |
| sodium carbonate | 30 wt % |
| SAMPLE NO. 2 | |
| citric acid | 40 wt % |
| trisodium citrate | 60 wt % |
| SAMPLE NO. 3 | |
| citric acid | 75 wt % |
| sodium hydroxide | 25 wt % |

Corrosion Inhibitor Evaluation Procedures
A. Panel Testing:
(a) Passivate two 3"×6" SS304 panels by immersion in 20% nitric acid at 60° C. for 30 minutes.
(b) Prepare 1 L of control water by artificially hardening 1 L of deionized water to 250 ppm hardness as calcium carbonate ($CaCO_3$), using a 2:1 Ca:Mg stock solution. Add 2% (w/w) sodium chloride (NaCl) to the control water.
(c) Prepare 500 mL of test water by adding the desired amount of the corrosion inhibitor system to 500 mL of the control water.
(d) Place 500 mL of test water in a 500 mL separatory funnel equipped with a Rotoflo™ stopcock. Repeat for control water.
(e) Suspend each separatory funnel so that the tip of
(f) Place each panel (test and control) on the appropriate hot plate and preheat to approximately 400° F. Monitor panel temperatures with a standard thermocouple.
(g) Adjust the stopcock on each funnel so that one drop is discharged every 10 seconds.
(h) For each setup, make slight adjustments to temperature and drip rate such that each drop completely vaporizes within 2 seconds of contacting panel. Do not allow panels to become too hot (>400° F.) or the drop will not vaporize evenly.
(i) Expose each panel to its respective solution for 25 hours, monitoring drip rate and panel temperature periodically. Make adjustments as necessary to ensure proper flash vaporization of each drop.
(j) Corrosion is easily detected by microscopic evaluation at 50× magnification.
B. Enclosure Testing:
(a) Spike one gallon of deionized water with the desired level of corrodants.
(b) Add the desired amount of the corrosion inhibitor system to the gallon of water.
(c) Adjust the pH of the test water to the desired level. Dilute solutions of sodium hydroxide (NaOH) or sulfuric acid ($H_2SO_4$) may be used to adjust pH, depending on what corrodants are being studied.
(d) Fill reservoir of test exposure cabinet with test water. Calibrate cabinet to provide proper temperature and relative humidity.
(e) Fill reservoir of control exposure cabinet with deionized water containing corrodants at the appropriate level. Calibrate cabinet to provide proper temperature and relative humidity.
(f) Operate exposure cabinets for 25 hours, monitoring visually for limescale deposition and corrosion. An ammonium thiocyanate spot test for iron is used to confirm the presence of corrosion.
(g) Total exposure time is 25 hours. Cabinet reservoirs should be refilled with test or control water as needed.

The efficacy of each of the acids included in the following Table was tested according to these procedures.

STAGING CABINET ADDITIVE

| COMMON NAME | ACID CLASSIFICATION | MW | pKa1 | pKa2 |
| --- | --- | --- | --- | --- |
| Tartaric Acid | C4-Dicarboxylic, two hydroxy group | 183.1 | 3.22 | 4.82 |
| Glutaric Acid | C5-Dicarboxylic | 132.1 | 4.31 | 5.41 |
| Adipic Acid | C6-Dicarboxylic | 146.1 | 4.43 | 5.41 |
| Pimelic Acid | C7-Dicarboxylic | 160.2 | 4.48 | 5.42 |
| Malonic Acid | C3-Dicarboxylic | 104.1 | 2.83 | 5.69 |
| Fumaric Acid | C4-Unsaturated dicarboxylic trans | 116.1 | 3.03 | 4.44 |
| Isophthalic Acid | Meta-dicarboxylic aromatic | 166.1 | 3.54 | 4.60 |
| Terephthalic Acid | Para-dicarboxylic aromatic | 166.1 | 3.51 | 4.82 |
| Maleic Acid | C4-Unsaturated dicarboxylic cis | 116.1 | 1.83 | 6.07 |
| Succinic Acid | C4-Dicarboxylic | 118.1 | 4.16 | 5.61 |
| Malic Acid | C4-Dicarboxylic, one hydroxy group | 116.1 | 3.40 | 5.11 |
| Suberic Acid | C8-Dicarboxylic | 174.2 | 4.51 | 5.40 |
| Oxalic Acid | C2-Dicarboxylic | 90.0 | 1.23 | 4.19 |

Although preferred embodiments of the invention are described herein in detail, it will be understood by those skilled in the art that variations may be made thereto without departing from the spirit of the invention or the scope of the appended claims.

What is claimed is:

1. A method of inhibiting chloride-induced corrosion and limescale formation in a flash heating system used in the food industry, which comprises adding to an aqueous solution for use in contact with ferrous metal surfaces or alloys of said system a composition consisting essentially of a corrosion inhibitng amount of at least one polycarboxylic acid and/or its alkali metal or alkaline earth metal salts to inhibit said chloride-induced corrosion and a sufficient amount of a base to bring the aqueous solution to a pH of about 3 to about 5 to inhibit said limescale formation.

2. The method according to claim 1, wherein said polycarboxylic acid is in the form of an alkali metal or alkaline earth metal salt.

3. The method according to claim 1, wherein said polycarboxylic acid is a mixture of a polycarboxylic acid and its alkali metal or alkaline earth metal salt.

4. The method according to claim 1, wherein said polycarboxylic acid is citric acid, oxalic acid, malonic acid, succinic acid, glutaric acid, adipic acid, pimelic acid, octanedioic acid, tartaric acid, malic acid, glutamic acid, maleic acid or fumaric acid.

5. The method according to claim 1, wherein said polycarboxylic acid is citric acid.

6. The method according to claim 1, wherein said polycarboxylic acid is a mixture of citric acid and sodium citrate.

7. The method according to claim 1, wherein the amount of said base is sufficient to bring the pH of said aqueous solution to a pH of about 4 to about 5.

8. The method according to claim 1, wherein said base is sodium hydroxide, potassium hydroxide, trisodium citrate, sodium carbonate or potassium carbonate.

* * * * *